(12) United States Patent
Wijers et al.

(10) Patent No.: US 10,844,553 B2
(45) Date of Patent: Nov. 24, 2020

(54) ARTIFICIAL TURF SYSTEM

(71) Applicant: Ten Cate Thiolon B.V., Nijverdal (NL)

(72) Inventors: Bart Wijers, Nijverdal (NL); Niels Gerhardus Kolkman, Nijverdal (NL); Frank Pfeiffer, Nijverdal (NL)

(73) Assignee: Ten Cate Thiolon B.V., Nijverdal (NL)

( * ) Notice: Subject to any disclaimer, the term of this patent is extended or adjusted under 35 U.S.C. 154(b) by 234 days.

(21) Appl. No.: 15/577,379

(22) PCT Filed: May 27, 2016

(86) PCT No.: PCT/NL2016/050384
§ 371 (c)(1),
(2) Date: Nov. 28, 2017

(87) PCT Pub. No.: WO2016/190744
PCT Pub. Date: Dec. 1, 2016

(65) Prior Publication Data
US 2018/0171566 A1  Jun. 21, 2018

(30) Foreign Application Priority Data
May 28, 2015  (NL) ..................... 2014875

(51) Int. Cl.
*E01C 13/08* (2006.01)
*A41G 1/00* (2006.01)
(Continued)

(52) U.S. Cl.
CPC .............. *E01C 13/08* (2013.01); *A41G 1/009* (2013.01); *B29B 9/12* (2013.01);
(Continued)

(58) Field of Classification Search
CPC ............ A41G 1/009; E01C 13/08; B29B 9/12
(Continued)

(56) References Cited

U.S. PATENT DOCUMENTS 6,818,274 B1  11/2004  Buck et al.
2002/0048676 A1*  4/2002  McDaniel ............... A63K 1/00
428/404

(Continued)

FOREIGN PATENT DOCUMENTS

CN  1432089  7/2003
CN  101861434  10/2010
(Continued)

OTHER PUBLICATIONS

Hasegawa et al., JP 2002/059916 A machine translation, Jul. 20, 2005, entire machine translation (Year: 2005).*
(Continued)

*Primary Examiner* — Humera N. Sheikh
*Assistant Examiner* — Katherine A Christy
(74) *Attorney, Agent, or Firm* — N.V. Nederlandsch Octrooibureau; Katelyn J. Bernier; Catherine A. Shultz

(57) ABSTRACT

An artificial turf system comprises a resilient layer, an artificial grass layer comprising a substrate and pile fibers upstanding from the substrate and an infill layer. The infill layer comprises smooth, hard granules having a mean size of between 1.8 mm and 10 mm disposed on the substrate and interspersed between the pile fibers. The smooth, hard granules provide improved characteristics in terms of foot release.

19 Claims, 3 Drawing Sheets

(51) Int. Cl.
*B29B 9/12* (2006.01)
*B29K 21/00* (2006.01)

(52) U.S. Cl.
CPC .. *B29K 2021/003* (2013.01); *B29K 2995/007* (2013.01); *B29K 2995/0073* (2013.01)

(58) Field of Classification Search
USPC .......................................................... 428/17
See application file for complete search history.

(56) References Cited

U.S. PATENT DOCUMENTS

| | | | |
|---|---|---|---|
| 2007/0160800 A1* | 7/2007 | Reddick | E01C 13/08 428/87 |
| 2008/0075896 A1* | 3/2008 | Sawyer | E01C 13/08 428/17 |
| 2008/0141516 A1 | 6/2008 | Julicher et al. | |
| 2011/0081506 A1* | 4/2011 | Lee | C08L 23/12 428/17 |
| 2011/0135851 A1* | 6/2011 | Dozeman | B29B 9/06 428/17 |
| 2011/0171401 A1 | 7/2011 | Cook | |
| 2012/0027962 A1 | 2/2012 | Huff et al. | |

FOREIGN PATENT DOCUMENTS

| | | | |
|---|---|---|---|
| EP | 2 119 830 A2 | | 11/2009 |
| JP | 2002069916 A | * | 3/2002 |
| WO | 0198589 | | 12/2001 |
| WO | 2009042346 | | 4/2009 |
| WO | WO-2012138216 A1 | * | 10/2012 ......... B29B 17/0026 |

OTHER PUBLICATIONS

Kent et al., Development and assessment of a device and method for studying the mechanical interactions between shoes and playing surfaces in situ at loads and rates generated by elite athletes; ISSN 1476-3141 print/ISSN 1752-6116 online © 2012 Taylor & Francis; http://dx.doi.org/10.1080/14763141.2011.650188.

* cited by examiner

ARTIFICIAL TURF SYSTEM

BACKGROUND OF THE INVENTION

1. Field of the Invention

The present invention relates to artificial turf systems and more particularly to turf systems provided with an infill that gives improved play characteristics. The invention also relates to an improved infill material and the use of such an infill material in achieving improved lateral foot release performance.

2. Description of the Related Art

Artificial turf systems are well known for various sporting and aesthetic purposes and have developed through a number of generations to their present form. In general, such systems seek to achieve the same characteristics as their natural counterparts although in certain areas these may have already been surpassed, at least in terms of predictability of behaviour.

Typical third generation turf systems comprise a backing layer with an upper surface and an infill layer of soft granules disposed between the fibres. The backing layer may consist of a woven fabric in which artificial grass fibres are tufted to provide pile fibres oriented in an upward position and fixed to the woven fabric by a backing layer of latex or polyurethane. Alternatively, the backing and the pile fibres can be produced simultaneously by weaving the carpet. Here there is considerable freedom for the position of the pile fibres and the backing structure.

Installation of the turf system typically involves providing a layer of loose sand, strewn between the upstanding turf fibres, which by its weight holds the backing in place and supports the pile in upward position. Onto this sand layer and also between the artificial turf fibres, soft elastomeric granules are strewn, forming a loose performance infill layer that provides the necessary sport performance. These performance characteristics will be depend on the intended use but for most sports will include: rotational and lineair grip; force reduction; vertical ball bounce; and rotational friction. This performance can be further supported by applying a shock pad or e-layer directly under the backing layer. One system of this type has been described in UK patent application GB2429171.

Although such systems provide excellent performance under most circumstances, their use at the highest levels of sport is still limited and, in certain criteria, they have not managed to achieve the performance of the best quality natural grass pitches. The present invention attempts to further improve on the performance of artificial turf systems.

BRIEF SUMMARY OF THE INVENTION

According to the invention there is provided an artificial turf system comprising: a resilient layer; an artificial grass layer comprising a substrate and pile fibres upstanding from the substrate; and an infill layer, the infill layer comprising smooth, hard granules having a mean size of between 1.8 mm and 10 mm disposed on the substrate and interspersed between the pile fibres.

In existing systems using rubber based infill materials, it has been observed that excess lateral forces may arise due to impact on a loaded foot. The rubber infill material provides good traction allowing an athlete to accelerate and change direction without slipping. Nevertheless, on lateral impact, a studded shoe may not break-away from the surface as easily as is the case for natural turf.

The breakaway problem has been identified as a result of the development of new testing possibilities, in particular, the B.E.A.S.T. (BioCore Elite Athlete Shoe-Surface-Tester) test machine developed by Kent et al. and described in the article, "Development and assessment of a device and method for studying the mechanical interactions between shoes and playing surfaces in situ at loads and rates generated by elite athletes", Kent et al. 2012 Sports Biomechanics, DOI:10.1080/14763141.2011. 650188, the contents of which are incorporated herein by reference in their entirety.

The BEAST test protocols were developed to study the safety of artificial turf structures and have been adopted by the NFL based on a number of major concerns. As written in the Kent article, one of the primary concerns is the interaction between a player's foot, the shoe, and the playing surface. A player needs grip so that he/she can accelerate, stop, and change direction. But this same interaction may also be a risk of injury to the lower extremities. The Kent article describes a device and method for simulating and measuring shoe-turf interactions at loads and rates generated in situ by elite athletes during performance. Using the BEAST test protocols it has become possible to quantify the break-away force. The presently proposed turf system using an infill of relatively large, smooth, hard granules has significantly improved the results according to the BEAST test protocols. Without wishing to be bound by theory, it is believed that the relative smoothness of the particles combined with their size allows them to release a loaded foot more effectively, while still ensuring the necessary traction characteristics during normal use. This is particularly the case for rotational movement, whereby peak rotational forces are significantly lowered with respect to natural turf.

The skilled person will understand that to achieve the above-mentioned effects, not all of the infill needs to comprise granules having the denoted characteristics. In the following, granules is used to refer to the smooth, hard granules having the designated size. Other particles will be referred to as infill particulates. According to one aspect of the invention, the granules may be predominantly present in the infill layer. In this context, predominantly present requires that at least 50% of the layer by volume comprises such granules. Alternatively, the infill layer may comprise at least 80 vol % of the granules or even more than 90 vol %. The remaining volume may be made up of infill particulates falling outside the denoted range. In this context, 50% by volume is intended to denote one part of granules to one part of other particulates prior to mixing. The infill particulates may be of the same material but having a different size. Alternatively, they may be of a different material. A mixture of smooth, hard granules with a small volume of rubber particulates (which by its nature has a high coefficient of friction) may allow a careful adjustment of the breakaway force according to the desired result. The addition of a minimum amount of rubber particulate may also assist in maintaining energy restitution properties in the infill layer.

According to the invention, the granules are hard and they may have a surface hardness of greater than Shore D 45. In general, the Shore A hardness scale is used for defining the hardness of rubbers and elastomers. The material chosen for the granules may be beyond the Shore A scale or at least above Shore A 90. The Shore D scale is more appropriate for determining the hardness of thermoplastic materials used as granulates and a value of Shore D of 45 may be seen as a minimum. More preferably, the granules may have a surface hardness greater than Shore D 48, or even greater than Shore D 50. In fact much harder materials, more frequently measured on the Rockwell R scale of hardness may even be used e.g. having Rockwell R hardness of greater than 20 and including ceramics, stone, silica and metals. Although reference is given to the hardness, it will be understood that the crush strength of the granules is also important and they should not be subject to crumbling or breakage during normal use.

In terms of size of the granules, the skilled person will understood that although reference is given to the mean size of the granules being between 1.8 mm and 10 mm, a number of different procedures may be used to determine this size. In the present context, this value is given according to ASTM C136/C136M-14 "Standard Test Method for Sieve Analysis of Fine and Coarse Aggregates". In one embodiment, the granules may have a mean size of between 2 mm and 4 mm. In another embodiment, the granules may have a mean size of between 2 mm and 3 mm. As indicated above, not all of the particles in the infill layer need meet the specification given to the granules. In terms of size, the number of particles within the defined size range may be given by D90 for the upper limit and D50 for the lower limit, more preferably D70 D30 or even D20 for the lower limit.

In a preferred embodiment of the invention, the granules comprise a thermoplastic material. It will be understood that the volumes of materials used in constructing a full-sized sports field require that the infill is relatively cheap to produce. Preferably it can also be made of recycled materials and can itself be recycled. Certain thermoplastics have already been extensively used in this context e.g. for artificial grass fibre manufacture and their further use as granules may be preferred. The material for the granules may be selected from the group comprising: polyethylene (PE, LDPE, LLDPE, MDPE, HDPE), polypropylene (PP), polyamides (PA), polyurethane PU), polystyrene (PS), expanded polystyrene (EPS), polycarbonate (PC), polyethylene terephthalate (PET), polyethylene isosorbide terephthalate (PEIT), polyethylene furanoate (PEF), polyhydroxy alkanoates (PHA), polylactic acid (PLA), acrylonitrile butadiene styrene (ABS) polybutylene succinate (PBS), polybutylene adipate co-terephthalate (PBAT), polybutylene terephthalate (PBT), polycaprolactone (PCL), phenol formaldehyde (PF) polypropylene carbonate (PPC), polytrimethylene terephthalate (PTT), polyvinyl chloride (PVC), polyvinyl alcohol (PVOH), thermoplastic starch (TPS) and combinations of the above. Mixtures may also include thermoplastic elastomers (TPE) e.g. mixtures of TPE with PE where the PE content is greater than 30%, or TPEs with a high content of polystyrene or plastomers such as Exact™ by Exxon Mobil and Affinity™ by DOW Chemical.

The granules may be homogenous in structure or may comprise mixtures of materials. In one embodiment, thermoplastic material may be combined with a filler such as chalk or the like, which may be for the purpose of reducing cost, increasing specific density or adjusting other characteristics of the granules. In another embodiment, the granules may have a thermoplastic outer surface coated onto a non-thermoplastic core. The core may also be hollow. In a still further embodiment, the granule may contain other inclusions including air. Foamed granules may be used to reduce the specific density and also to reduce the overall material cost. This may be achieved by the introduction of blowing agents during the production process.

According to a further aspect of the invention, the granules may have a specific density of less than 2.0 or even less than 1.5. The granules may have a lower limit of specific density of greater than 0.4 or greater than 0.6 and in some circumstances may be chosen to have a specific density that is greater than 1.0. It is not excluded that they may also be present in a range of specific densities.

According to the invention, the granules must be smooth. The skilled person will be aware that smoothness may be defined in a number of ways but for the sake of the present invention is defined as requiring a relatively low coefficient of friction. In a preferred embodiment, the granules may have a surface for which the frictional coefficient is less than 0.5. The frictional coefficient in this case is the static frictional coefficient measured for two surfaces of the same material in contact according to ASTM G115-10(2013).

In addition to having a low coefficient of friction, the granules should also be smooth in terms of their shape. In one embodiment, the granules are round. In this context, round is intended to denote that they have medium to high sphericity and roundness. Preferably they have a sphericity greater than 0.5 or greater than 0.7 or even greater than 0.9, wherein sphericity is defined as the ratio of the diameter of a sphere of equal volume to the granule to the diameter of the circumscribing sphere.

The granules may have roundness values of greater than 0.5. or greater than 0.7 or even greater than 0.9, wherein roundness is defined as the ratio of the average radius of curvature of the corners and edges of the granule to the radius of the maximum sphere that can be inscribed. The skilled person will be well aware that the properties of the granule will depend both on roundness and sphericity and one can compensate the other in arriving at a granular infill that has low break-away characteristics. One measure of this may be the angle of repose. The granules preferably have an angle of repose (in their dry state) of less than 40 degrees, more preferably less than 35 degrees and in certain embodiments, less than 30 degrees. The angle of repose is the angle to the horizontal of the cone produced when the granules are carefully poured to form a mound i.e. it is the critical angle to which the granules can be piled without slumping.

The infill layer can be present at a depth that is sufficient to adequately support the pile fibres over a substantial portion of their length and will depend on the length of these fibres and the desired free pile. In a preferred embodiment, the infill layer has a depth of at least 10 mm. This may correspond to at least the depth of a typical stud being used for the intended sport. In other embodiments, the infill layer may be present to a depth of at least 20 mm or even to a depth of greater than 30 mm. It will be understood that the final depth will also depend upon whether the infill layer is the only layer on the substrate supporting the pile fibres as further discussed below. In an embodiment, the pile fibres may be at least 50 mm in length or even at least 60 mm in length. Depending on the nature of the sport, they may extend at least 10 mm or at least 15 mm or even more than 20 mm above the level of the infill.

According to an important aspect of the invention, because the infill layer comprises hard granules, their ability to absorb energy or provide energy restitution is different to that of traditional elastomeric infill granules. For this reason, a resilient layer must be provided at a different location within the turf system. According to one embodiment, the resilient layer comprises a shock-pad structure beneath the substrate of the artificial grass layer. The shock-pad structure may be any appropriate conventional shock-pad structure and may also combine the functions of water transport. One such structure comprises recycled plastic granules bound with polyurethane binder and is available as EcoCept™ from Ten Cate. Alternative shock-pad structures comprise elastomeric granules, either bound or loose and closed-cell woven foam structures such as Sine™ available from Ten Cate The system may also comprise one or more additional particulate layers disposed on the substrate beneath the infill layer. The additional particulate layers may have various functions, including shock absorption, pile stabilisation, drainage, filling and the like and may be selected from the group comprising: sand, grit, rubber particles, elastomer particles, thermoplastic particles and any other particles that do not meet the definition of the infill granules.

The invention also relates to an infill material comprising a predominance of smooth, hard granules having a mean size of between 1.8 mm and 10 mm for use in an artificial turf system for the reduction of shoe entrapment forces. The infill material may be used to reduce lateral shoe entrapment forces with respect to rubber based infill materials and may also be used to reduce rotational entrapment forces with respect to both rubber infill and natural turf. The granules may be as defined above or hereinafter.

The invention still further relates to the use of the infill material defined above in an artificial turf system, wherein the infill material is provided to a depth of between 10 mm and 40 mm and a foot release force does not exceed 3.5 KN according to the BEAST pre-load translation test.

The invention relates in particular to the use of the infill material defined above in the manufacture of a pitch for football, American football or rugby.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Example 1

Figure 1:
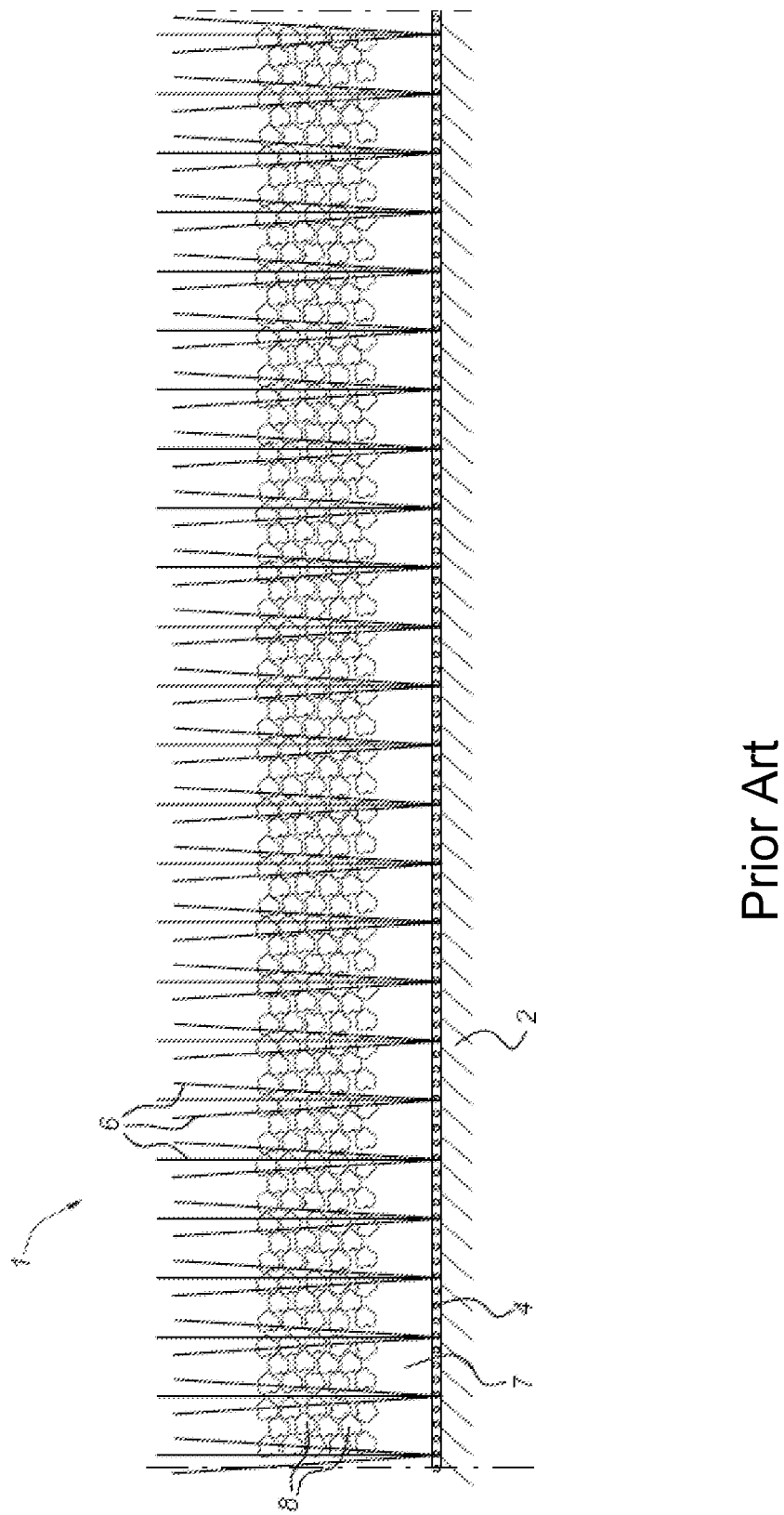
FIG. 1 shows a cross-section through an artificial turf system according to the prior art.

FIG. 1 shows a cross-section through a conventional artificial turf system 1, comprising a stabilised sub base 2, a substrate 4, pile fibres 6 and an infill 8 formed of elastomeric rubber particles and a sand layer 7. The substrate 4 and pile fibres 6 were the Slidemax60™ tufted grass system from Greenfields™ with DS XWR™ pile fibres 6. The sand layer 7 was 15 mm and the infill 8 had Shore A hardness 60-65 and a grain size of 0.8 mm-2.5 mm of undefined shape. The turf system 1 of Example 1 was considered to represent the most optimal state of the art artificial turf system presently available for purposes of foot breakaway and sliding performance.

Example 2

Figure 2:
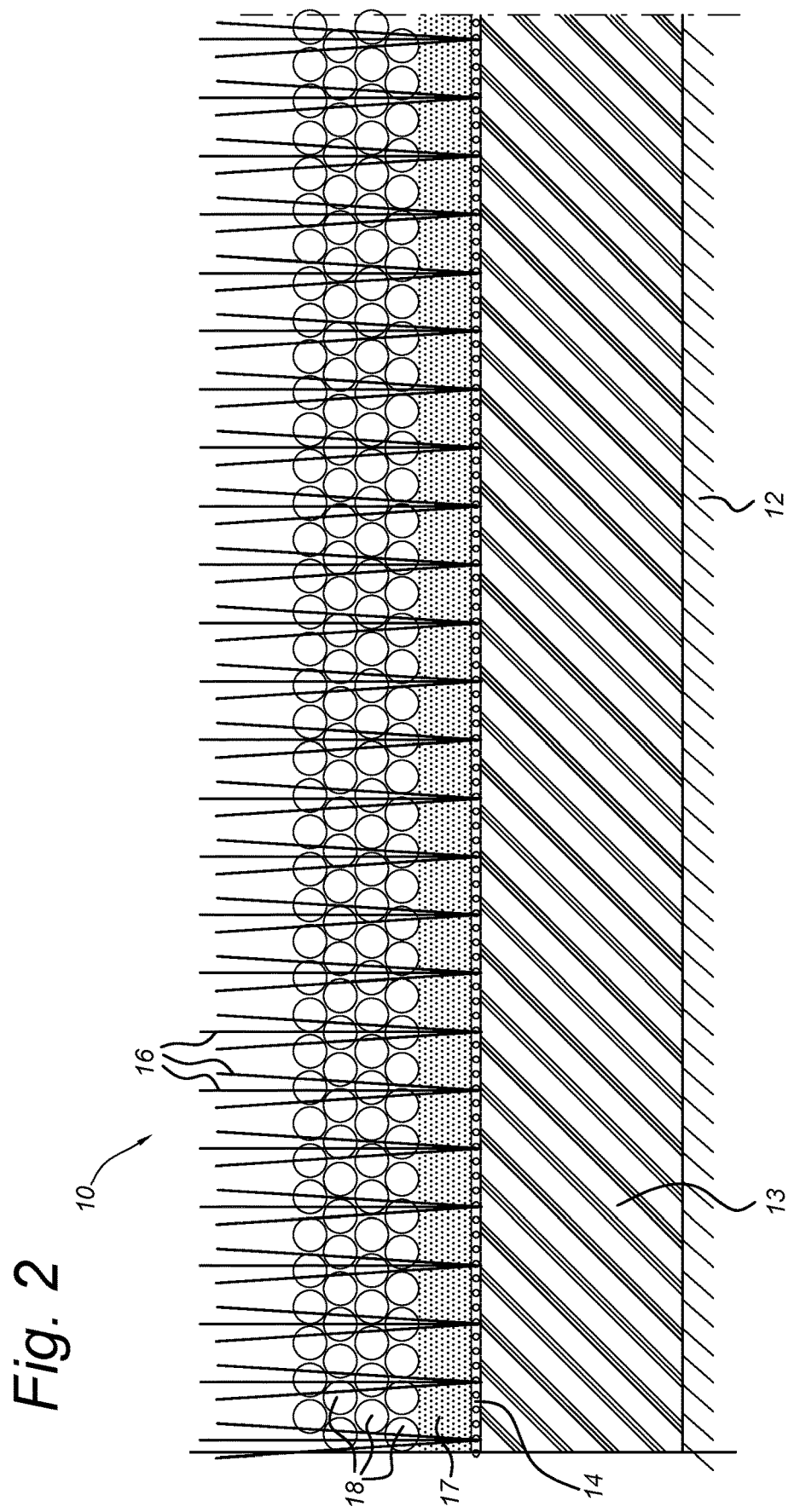
FIG. 2 shows a cross-section through an artificial turf system according to an embodiment of the present invention.

FIG. 2 shows a cross-section through an artificial turf system 10 according to an embodiment of the present invention. The turf system 10, comprises a stabilised sub-base 12, a resilient layer 13, substrate 14 having pile fibres 16, a particulate layer 17 and an infill layer 18. According to the example, the resilient layer 13 was an Ecocept™ 40 mm layer comprising 60% rubber and 40% recycled plastic granules with a 14 wt. % PU binder. The artificial grass layer was a woven carpet MX from Greenfields with 50 mm Trimension fibre having diamond section fibres. The particulate layer 17 was 10 mm sand infill graded 0.2-1.0 mm with a coverage of 15 kg/m2. The infill layer consisted of 25 mm depth of PE granules, having a hardness of 40 Shore D, well rounded with medium sphericity, 3.8 mm average diameter and a coverage of 12.5 kg/m2.

Both of the turf systems of Example 1 and Example 2 were subjected to testing according to the BEAST test protocols as defined in the Kent article.

Figure 3:
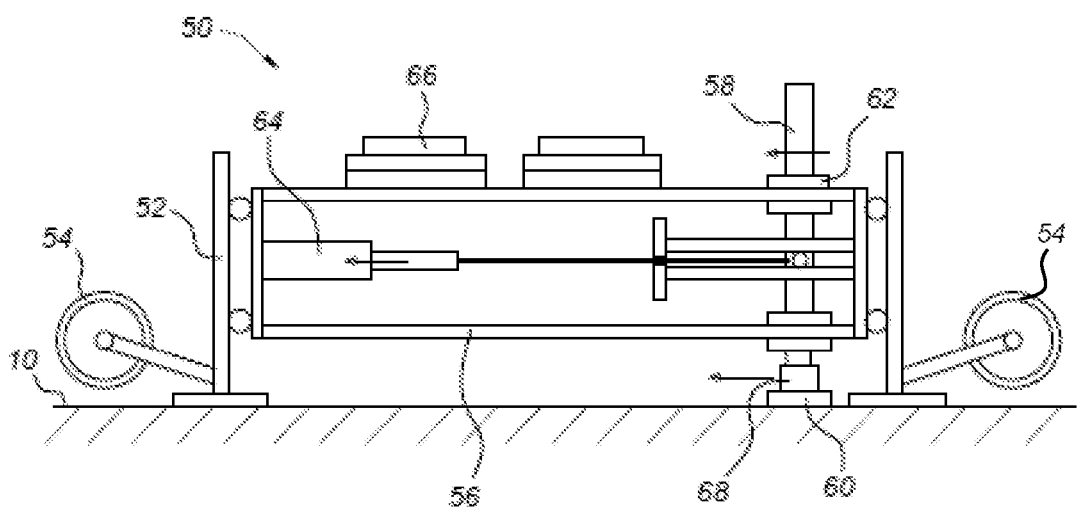
FIG. 3 shows a schematic view of a BEAST testing apparatus.

FIG. 3 shows a schematic view of the BEAST device 50 set up for the purpose of performing the translation test on a turf system 10 according to the invention. The BEAST device 50 comprises an outer frame 52 that stands freely on the turf system 10. Wheels 54 are provided for transporting. An inner frame 56 is mounted for slideable vertical movement within the outer frame 52 and carries a shaft 58 having a studded sole 60 that contacts the turf system 10. The shaft 58 is mounted in the inner frame by sliding bearings 62 for lateral movement under the control of a pneumatic actuator 64. Weights 66 may be applied to the inner frame to apply pressure to the studded sole 60. A load cell 68 measures the force and torque between the shaft 58 and the studded sole 60.

The BEAST device 50 was used to carry out three tests reflecting generic classes of tasks: 1) full power translation test with 285 Kg weight and 11.4 bar pneumatic pressure; 2) half power translation test with 285 Kg weight and 5.5 bar pneumatic pressure; and 3) half power rotation test with 285 Kg weight and 4.0 bar pneumatic pressure applied to rotate the shaft 58. All three tests were performed using a molded American football shoe as the studded sole 60. The test specifications and protocol were as defined in the Kent article.

Test 1—Full Power Translation Test

The horizontal displacement and horizontal force against time were measured for the turf systems of Example 1 and Example 2 and compared with reference to standard values for natural turf. At full power translation with a lateral force of 11.4 bar pneumatic pressure, the system of Example 2 showed a displacement of the shaft of >200 mm after around 0.1 seconds. The maximum force encountered was 3 kN and the studded sole 60 moved freely through the infill. This is considered to be a full free release, at least equal to natural turf performance. The artificial turf system 1 of Example 1 with elastomeric infill granules achieved a maximum displacement of 40 mm and exhibited peak forces of 5 kN. The studded sole 60 was still holding at this value and this may be considered as an undesirable result. In the case of Example 1, the player would experience too much force on his foot, which could lead to severe injuries.

Test 2—Half Power Translation Test

The horizontal displacement and horizontal force against time were again measured for the turf systems of Example 1 and Example 2 and compared with reference to standard values for natural turf. At half power translation, with a lateral force of 5.5 bar pneumatic pressure, the system of Example 2 after under 0.1 seconds showed a maximum displacement of the shaft of >28 mm. The maximum force encountered was around 2.5 kN. The artificial turf system 1 of Example 1 with elastomeric infill granules achieved a maximum displacement of around 17 mm within the same time period and exhibited peak forces of between 2.5 and 3.0 kN. At half power it can be seen that both turf systems of Example 1 and Example 2 hold to a similar level of horizontal force. The test foot holds its position (In this context Hold position means that the horizontal displacement is lower than 40 mm). This is a desirable characteristic, referred to as grip. If at half power translation the foot were to be released, the grip would be too low.

Test 3—Half Power Rotation Test

The rotational displacement and torque were measured against time for the turf systems of Examples 1 and 2 and compared to reference values for natural turf. At half power rotation, with a force of 4.0 bar pneumatic pressure applied via a pulley to rotate the shaft 58, the system of Example 2 after around 0.15 seconds showed a maximum rotation of 130 degrees. The maximum torque encountered was less than 80 N·m. The artificial turf system 1 of Example 1 with elastomeric infill granules achieved a maximum displacement of just 10 degrees and exhibited peak forces of over 100 N·m. These values for Example 1 at half power rotation correspond closely to those for natural turf. At half power rotation the artificial turf system 10 according to the invention of Example 2 far exceeds the best values attained both for natural turf or for the existing turf system 1 of Example 1. The test foot easily releases its position and can rotate freely. This is a desirable characteristic in reducing sports injuries. Since the values for rotation measured at half power already indicated adequate breakaway and displacement, no further rotation tests at full power were carried out for the turf system according to the invention.

Further Tests

In addition to the above mentioned BEAST protocol tests, additional investigation was carried out on the turf system 10 of Example 2 tested according to the FIFA** performance protocol (see FIFA Quality Concept January 2012). The results indicated the following values:

Shock absorption: 68%
Vertical Deformation: 9 mm
Vertical Ball bounce: 75 cm
Rotational friction: 30 Nm
Ball roll: 6 m In addition to the disclosed example described in relation to FIG. 2, the skilled person will understand that many other configurations may be considered, which will equally fall within the scope of the present claims. In particular, according to one artificial turf system, the elastomeric infill layer may be just partly replaced by the smooth, hard infill granules as defined above. In particular, the top 10 mm of infill layer could be replaced by the smooth, hard granules. Some typical artificial turf systems may include:

|  | Example 3 | Example 4 |
| --- | --- | --- |
| Shock pad or e-layer | No | Yes |
| Turf system | Turfted 60-70 mm | Tufted 40-60 mm |
| Sand infill layer | 5-20 mm | 5-20 mm |
| Elastomeric infill | 5-20 mm | 5-20 mm |
| Smooth hard infill | 10-20 mm | 10-20 mm |

Many further modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. An artificial turf system comprising:
   an artificial grass layer comprising a substrate and pile fibres upstanding from the substrate;
   a resilient layer comprising a shock-pad structure beneath the substrate of the artificial grass layer;
   an infill layer, disposed on the substrate and interspersed between the pile fibres, the infill layer consisting of particles comprising smooth, hard granules having a mean size in a range A of between 2 mm and 4 mm and the infill layer further comprising infill particulates, wherein the granules have a surface hardness in a range B of greater than Shore D 45; wherein the granules are smooth with a surface for which a frictional coefficient is in a range C of less than 0.5, and wherein a range D of at least 50 vol % of the particles are smooth, hard granules falling within the defined size range; and
   wherein the values within the ranges A, B, C, and D are selected such that a foot release force of the artificial turf system does not exceed 3.5 KN according to a BEAST pre-load translation test.

2. The system according to claim 1, wherein at least 80 vol % of the particles are smooth, hard granules having a mean size of between 2 mm and 4 mm.

3. The system according to claim 1, wherein the granules have a surface hardness of greater than Shore D 48.

4. The system according claim 1, wherein the granules are compostable and biodegradable and comprise a material selected from the group consisting of: PEF, PHA, PLA, PBS, PCL, PBAT, and TPS.

5. An artificial turf system comprising:
   an artificial grass layer comprising a substrate and pile fibres upstanding from the substrate;
   a resilient layer comprising a shock-pad structure beneath the substrate of the artificial grass layer;
   an infill layer, disposed on the substrate and interspersed between the pile fibres, the infill layer consisting of particles comprising smooth, hard granules having a mean size in a range A of between 2 mm and 4 mm and the infill layer further comprising infill particulates, wherein the granules have a surface hardness in a range B of greater than Shore D 45, wherein the granules are smooth with a surface for which a frictional coefficient is C of 0.5, and wherein a range D of at least 50 vol % of the particles are smooth, hard granules falling within the defined size range; and
   wherein the values within the ranges A, B, and D are selected and value C is such that a foot release force of the artificial turf system does not exceed 3.5 KN according to a BEAST pre-load translation test.

6. The system according claim 1, wherein the granules are of medium to high sphericity and roundness, with sphericity greater than 0.5 and roundness values of greater than 0.5.

7. The system according to claim 1, wherein the granules exhibit an angle of repose of less than 40 degrees.

8. The system according to claim 1, wherein the infill layer has a depth of at least 20 mm.

9. The system according to claim 1, wherein the pile fibres have a length of greater than 50 mm and extend at least 10 mm above the level of the infill.

10. The system according to claim 1, further comprising one or more additional particulate layers disposed on the substrate beneath the infill layer, the additional particulate layers being selected from the group comprising: sand, grit, rubber, cork, wood, elastomer and plastic particulates.

11. An infill material for use in an artificial turf system, the infill material consisting of particles, the particles comprising hard granules having a mean size of between 2 mm and 4 mm and infill particulates, wherein the granules have a surface hardness of greater than Shore D 45 and at least 50 vol % of the particles are hard granules falling within the defined size range, and the granules are compostable and biodegradable and comprise a material selected from the group consisting of: PEF, PHA, PLA, PBS, PCL, PBAT, and TPS.

12. The infill material of claim 11, wherein at least 80 vol % of the particles are hard granules having a mean size of between 2 mm and 4 mm.

13. The infill material of claim 11, wherein the granules have a surface hardness of greater than Shore D 48.

14. The infill material of claim 11, wherein the granules have a frictional coefficient of 0.5.

15. The infill material of claim 11, wherein the granules are of medium to high sphericity and roundness, with sphericity greater than 0.5 and roundness values of greater than 0.5.

16. A method for reducing shoe entrapment forces in an artificial turf system, the method comprising: providing an infill material according to claim 11 and arranging the infill material over a depth of between 10 mm and 40 mm of the artificial turf such that a foot release force of the artificial turf does not exceed 3.5 KN according to a BEAST pre-load translation test.

17. The method according to claim 16, wherein the artificial turf system is a pitch for soccer, American football or rugby.

18. The system according to claim 1, wherein the shock-pad structure comprises bound granules of recycled plastic arranged to allow transport of water.

19. The system according to claim 18, wherein the granules of recycled plastic are bound with polyurethane binder in an amount of 14 wt. % PU binder.

* * * * *